United States Patent
Izuna et al.

(10) Patent No.: US 7,269,574 B2
(45) Date of Patent: Sep. 11, 2007

(54) METHOD FOR SUPPORTING THE ORDERS RECEIVED OF TRANSFORMER

(75) Inventors: Tomomi Izuna, Shibata (JP); Hiromasa Ozaki, Arakawa (JP); Hideki Masuhara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 383 days.

(21) Appl. No.: 10/006,684

(22) Filed: Dec. 10, 2001

(65) Prior Publication Data

US 2003/0057962 A1 Mar. 27, 2003

(30) Foreign Application Priority Data

Sep. 12, 2001 (JP) .............. 2001-275885

(51) Int. Cl.
*G06Q 10/00* (2006.01)
(52) U.S. Cl. ............... 705/28; 705/26; 705/27; 705/29
(58) Field of Classification Search ............ 705/26, 705/27, 28, 29
See application file for complete search history.

(56) References Cited

U.S. PATENT DOCUMENTS

| | | | | |
|---|---|---|---|---|
| 5,574,380 | A * | 11/1996 | Dubin | 324/654 |
| 6,061,609 | A * | 5/2000 | Kanoi et al. | 700/291 |
| 6,868,397 | B1 * | 3/2005 | McCaslin | 705/28 |
| 2002/0082934 | A1 * | 6/2002 | Koda et al. | 705/26 |
| 2003/0208365 | A1 * | 11/2003 | Avery et al. | 705/1 |

FOREIGN PATENT DOCUMENTS

| | | |
|---|---|---|
| TW | 442737 | 6/2001 |
| TW | 445423 | 7/2001 |
| WO | WO 01/48639 A1 | 7/2001 |

OTHER PUBLICATIONS

Savio, Leo J. "Transformer Monitoring System Transmits Data Automatically"; Transmission & Distribution; Feb. 1989, 41, 2, pp. 28-30.*

* cited by examiner

*Primary Examiner*—F. Ryan Zeender
*Assistant Examiner*—M. Thein
(74) *Attorney, Agent, or Firm*—Townsend and Townsend and Crew LLP

(57) ABSTRACT

In order to spread a transformer having energy saving and environmental effects widely and quickly, a method for supporting received orders of a transformer is provided. In the method, a first response including a customer's desired inquiry relating to an installation date of a measuring circuit is issued from a sales department to a customer who accessed a web site of the sales department. A second response including the installation date of the measuring circuit is issued from a measurement department in charge of measurement of the transformer. Since cooperative communication is achieved between the sales department and the measurement department in charge of the transformer measurement, the system can quickly cope with the customer who accessed the web site of the sales department and a social demand of early realization of energy saving and $CO_2$ reduction can be realized with highly excellent effects.

1 Claim, 24 Drawing Sheets

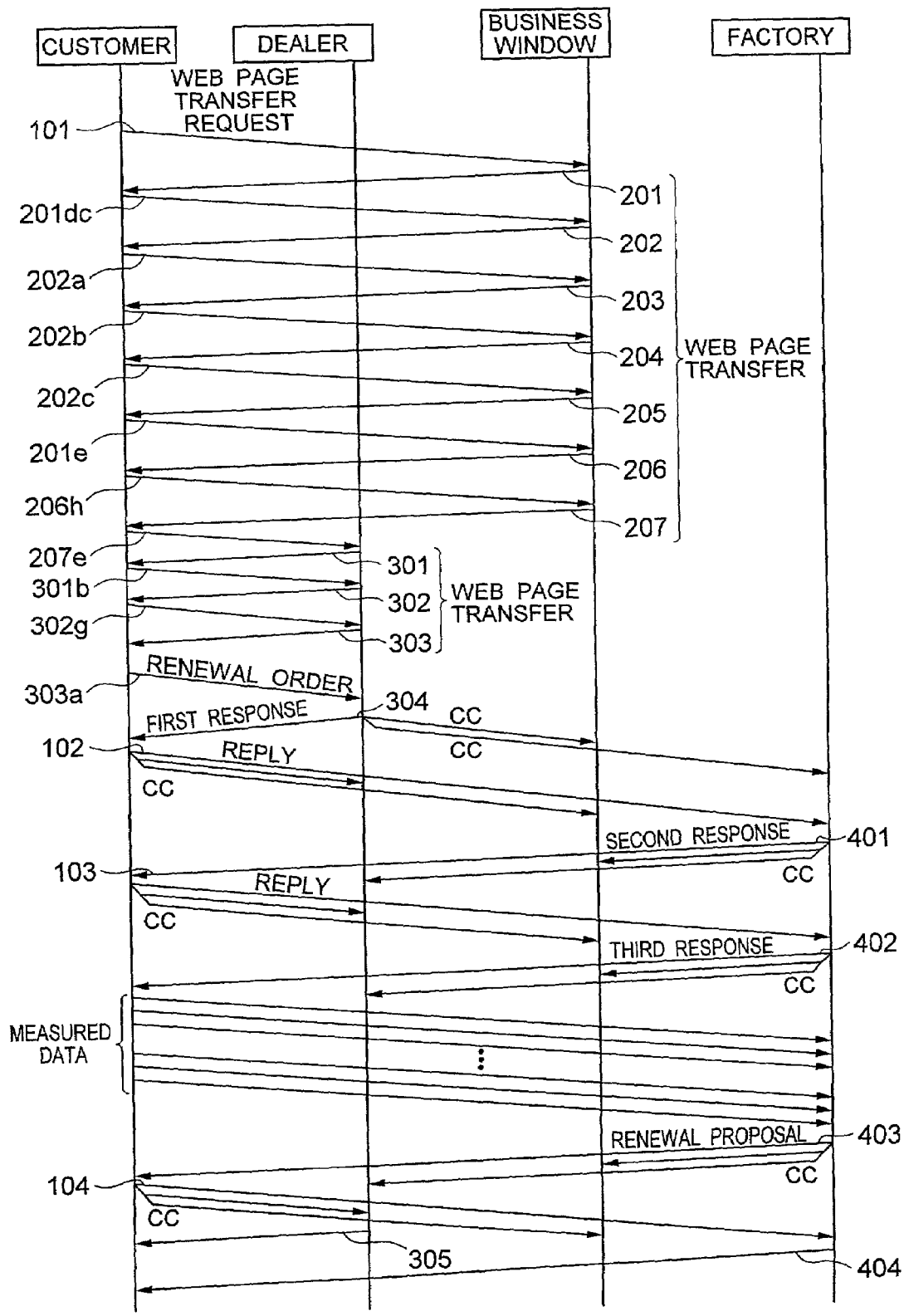

○○HOME | SEARCH |

○○○○○○○ INDUSTRIAL COMPONENTS & EQUIPMENT
K.K. ○○ WORKS INDUSTRIAL EQUIPMENT GROUP

| ◎ NEW INFORMATION | ◎ NEW PRODUCT INTRODUCTION — 201a | ◎ INTRODUCTION OF SEMINAR OPENING |
| --- | --- | --- |
| ◎ NET SALES SERVICE — 201e | ◎ INTRODUCTION OF PRODUCTS GROUPED BY PURPOSE — 201b | ◎ NATIONWIDE RELATED EXHIBITION INFORMATION |
| ◎ NATIONWIDE BUSINESS WINDOW | | ◎ INFORMATION MAGAZINE (VOLTAGE 21) |

☆ LIST OF DEALERS    ☆ SYSTEM PROPOSAL

◎ NATIONWIDE SERVICE WINDOWS    ☆ ENERGY SAVING PROPOSAL — 201c

◎ PRODUCT CATALOG REQUEST

◎ PRODUCT TYPE INQUIRY

PRODUCTION TYPE INTRODUCTION — 201d

CLICK DESIRED PRODUCT NAME

| | |
| --- | --- |
| ■ MOTORS — 201da | ■ INVERTERS / SERVO DCBL'S |
| ■ PROGRAMMABLE CONTROLLERS — 201db | ■ SWITCHES / CIRCUIT BREAKERS |
| ■ TRANSFORMERS — 201dc | ■ HOIST / MOTOR BLOCKS |
| ■ BUSINESS CLEANERS | ■ AIR COMPRESSORS |
| ■ PUMPS | ■ VENTILATORS / BLOWERS |
| ■ INK JET PRINTERS | ■ PRECISE DIES |

★ INTRODUCTION OF OUR INDUSTRIAL EQUIPMENT ★

A GENERAL GUIDE PAMPHLET OF INDUSTRIAL EQUIPMENT PRODUCTS IS GIVEN IN PDF FORMAT FOR YOUR UNDERSTANDING OF ALL THE PRODUCTS LINED UP

◎ INTRODUCTION OF INDUSTRIAL EQUIPMENT GROUP

◎ DEVELOPMENT OF INDUSTRIAL EQUIPMENT GROUP

◎ INTRODUCTION OF RELATED COMPANIES

☆ MATERIAL ACQUISITION INFORMATION

◎◎HOME | SEARCH |

◎◎ SUPER-ENERGY-SAVING TRNSFORMER  Super△△△△△△

HEISEI XX ◎◎◎◎◎    ◎◎◎◎ AWARD ACQUIRED

TOTAL LOSS ABOUT 1/2, SUPER ENERGY SAVING TRANSFORMER DEMANDED BY CURRENT AGE

ELECTRIC ENERGY WHICH IS A MUST TO INDUSTRIES AND OUR LIVINGS
FOR SUCH TRANSFORMERS SUPPORTING THE DEMAND, HIGH ENERGY CONVERSION EFFICIENCY IS REQUIRED
◎◎SUPER-ENERGY-SAVING TRANSFORMER SERIES Super△△△△△△ IS····

● FEAUTURES

1. REMARKABLY REDUCED "NO-LOAD LOSS" AND "LOAD LOSS" AND REALIZATION OF "ENERGY SAVING" AND "MINIMUM RUNNING COST" — 202a

2. IMPROVED WINDING STRUCTURE OF EMPOLYING CORE MADE OF AMORPHOUS ALLOY ENABLED REDUCTION OF TOTAL LOSS BY ABOUT 50% (WHEN COMPARED TO EXISTING STANDARD) — 202b

3. MERIT OBTAINED BY THE ATOM ARRAY STRUCTURE OF AMORPHOUS ALLOY APPLIED TO THE CORE OF THE TRANSFORMER — 202c

● SPECIFICATION LIST TABLE

■ Super△△△△△△ OIL-CONTAINED TRANSFORMER

● STANDARD CHARACTERISTIC TABLE — 202d

● ATTACHMENT LIST TABLE — 202e

● DIMENSIONAL TABLE

■ Super△△△△△△ OIL-CONTAINED TRANSFORMER

◎ WHEN YOU WISH "NEW INSTALLATION" OR "RENEWAL" FOR YOUR TRANSFORMER, CLICK "NATIONWIDE BUSINESS WINDOWS" AND ORDER A NEARBY DEALER — 202f

FIG. 5

○○HOME | SEARCH |

● FEATURE 1

REMARKABLY REDUCED "NON-LOAD LOSS" AND "LOAD LOSS" AND REALIZATION OF "ENERGY SAVING" AND "MINIMUM RUNNING COST"

ENERGY SAVING EFFECT
- ● GREATER ENERGY SAVING EFFECT FOR HIGHER LOAD FACTOR
- ● EVEN IN EITHER CASE OF NEW INSTALLATION AND RENEWAL, GREAT ENERGY SAVING EFFECT (SAVING OF POWER FEE, REDUCTION OF POWER AMOUNT AND REDUCTION OF $CO_2$) IS OBTAINED

■ NEW INSTALLATION (1,000kVA)

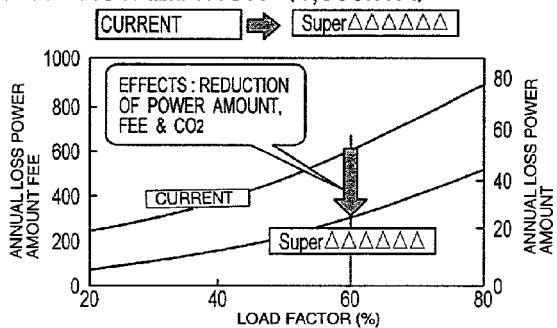

1. ANNUAL LOSS POWER AMOUNT FEE (THOUSAND YEN/YEAR)=[NO-LOAD LOSS (W)+LOAD LOSS (W)×(LOAD FACTOR)$^2$]/1,000×365 (DAYS)×24(h)×UNIT ELECTRICITY RATE (11 YEN/kWh)/1,000

2. $CO_2$ REDUCTION AMOUNT (t/year) : CALCULATED ACCORDING TO $CO_2$ EMISSION CCOEFFICIENT 0.423 [kg-$CO_2$/kWh] AT POWER RECEIVING END IN 1990. (NOTE : C EMISSION COEFFICIENT BY CARBON CONVERSION IS 0.106 [kg-C/kWh])

■ RENEWAL (EXAMPLE OF 1,000kVA)

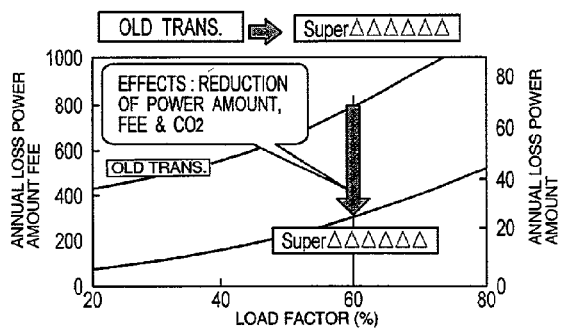

1. ANNUAL LOSS POWER AMOUNT FEE (THOUSAND YEN/YEAR)=[NO-LOAD LOSS (W)+LOAD LOSS (W)×(LOAD FACTOR)$^2$]/1,000×365 (DAYS)×24(h)×UNIT ELECTRICITY RATE (11 YEN/kWh)/1,000

2. $CO_2$ REDUCTION AMOUNT (t/year) : CALCULATED ACCORDING TO $CO_2$ EMISSION CCOEFFICIENT 0.423 [kg-$CO_2$/kWh] AT POWER RECEIVING END IN 1990. (NOTE : C EMISSION COEFFICIENT BY CARBON CONVERSION IS 0.106 [kg-C/kWh])

◎ WHEN YOU WISH "NEW INSTALLATION" OR "RENEWAL" FOR YOUR TRANSFORMER, CLICK "NATIONWIDE BUSINESS WINDOWS" AND ORDER A NEARBY DEALER

○○HOME | SEARCH |

● FEATURE 2
IMPROVED WINDING STRUCTURE OF EMPLOYING CORE MADE OF AMORPHOUS ALLOY ENABLED REDUCTION OF TOTAL LOSS BY ABOUT 50% (WHEN COMPARED TO EXISTING STANDARD)

■ LOSS (EXAMPLE OF 1,000kVA, 60% LOAD FACTOR)

◎ WHEN YOU WISH "NEW INSTALLATION" OR "RENEWAL" FOR YOUR TRANSFORMER, CLICK "NATIONWIDE BUSINESS WINDOWS" AND ORDER A NEARBY DEALER 204
204a

FIG. 7

◎◎HOME | SEARCH |

● FEATURE 3
MERIT PRODUCED BY ATOMIC ARRAY STRUCTURE OF AMORPHOUS ALLOY APPLIED TO TRANSFORMER CORE

AMORPHOUS ALLOY IS AN AMORPHOUS SOLID OBTAINED BY ABRUPTLY COOLING A RAW MATERIAL INCLUDING IRON, BORON, SILICON, ETC. FROM ITS MELTED STATE. THE ALLOY HAS A RANDOM STRUCTURE OF ATOMS RANDOMLY ARRANGED AND HAS A SMALL ENERGY LOSS (HYSTERESIS LOSS) GENERATED BY PASSING MAGNETIC FLUX THROUGH THE CORE. SINCE THE ALLOY CAN BE MADE AS THIN AS ABOUT 0.03mm AND THUS WHEN COMPARED TO A SILICON STEEL BAND, IT CAN REDUCE NO-LOAD LOSS (HYSTERESIS LOSS +EDDY CURRENT LOSS) DOWN TO ABOUT 1/5.

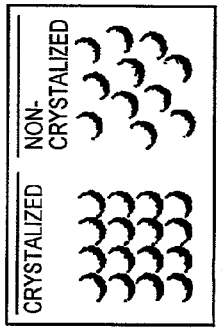

▲ AMORPHOUS ALLOY

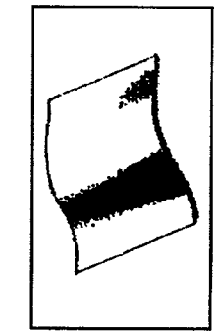

▲ SCHEMATIC DIAGRAM OF AMORPHOUS ALLOY — 205a

◎ WHEN YOU WISH "NEW INSTALLATION" OR "RENEWAL" FOR YOUR TRANSFORMER, CLICK "NATIONWIDE BUSINESS WINDOWS" AND ORDER A NEARBY DEALER

```
○○HOME | SEARCH |
```

BUSSINESS WINDOW

| MOTOR | INV/SERVO | PLC | SW/BREAKER | TRANSFORMER |
| HOIST/BLOCK | CLEANER | COMPRESSOR | PUMP | FAN/BLOWER | IJ PRINTER |

BUSSINESS WINDOW LIST ☆A CLICK OF [DEALER] DISPLAYS A DEALER LIST

K.K. ○○ WORKS

| Branch | Details | | |
|---|---|---|---|
| HOKKAIDO BRANCH | POSTAL CODE : 060-00XX<br>ADDRESS : KITANIJO ... CHUOU-KU, SAPPORO-SHI<br>TEL : 011-261-XXXX (REPRESENTATIVE) FAX : 011-221-XXXX<br>BUSINESS AREAS: HOKKAIDO | DEALER | 206a |
| TOHOKU BRANCH | POSTAL CODE : 980-85XX<br>ADDRESS : AOBA-KU 1-CHOME, SENDAI-SHI<br>TEL : 022-223-XXXX (REPRESENTATIVE) FAX : 022-223-XXXX<br>BUSINESS AREAS: AOMORI,AKITA,IWATE,MIYAGI,YAMAGATA,FUKUSHIMA | DEALER | 206b |
| INDUSTRIAL EQUIPMENT GROUP GENERAL BUSINESS HEADQUARTER | POSTAL CODE : 261-71XX<br>ADDRESS : MIHAMA-KU NAKASE, CHIBA-SHI<br>TEL : 043-297-XXXX (REPRESENTATIVE) FAX : 043-390-XXXX<br>BUSINESS AREAS: IBARAKI,TOCHIGI,GUNNMA, SAITAMA,CHIBA,TOKYO, NIIGATA,YAMANASHI,NAGANO | DEALER | 206c |
| YOKOHAMA BRANCH | POSTAL CODE : 220-00XX<br>ADDRESS : NISHI-KU TAKASHIMA, YOKOHAMA-SHI<br>TEL : 045-451-XXXX (REPRESENTATIVE) FAX : 045-451-XXXX<br>BUSINESS AREAS: KANAGAWA,SHIZUOKA (EAST SIDE OF FUJI-RIVER) | DEALER | 206d |
| HOKURIKU BRANCH | POSTAL CODE : 920-08XX<br>ADDRESS : MOTOMACHI KANAZAWA-SHI<br>TEL : 076-263-XXXX (DIAL-IN) FAX : 076-263-XXXX<br>BUSINESS AREAS: TOYAMA,ISHIKAWA,FUKUI | DEALER | 206e |
| CHUBU BRANCH | POSTAL CODE : 460-84XX<br>ADDRESS : NAKA-KU SAKAE, NAGOYA-SHI<br>TEL : 052-243-XXXX (REPRESENTATIVE) FAX : 052-259-XXXX<br>BUSINESS AREAS: GIFU, SHIZUOKA(WEST SIDE OF FUJI RIVER),AICHI,MIE | DEALER | 206f |
| KANSAI BRANCH | POSTAL CODE : 559-85XX<br>ADDRESS : SUMINOE-KU MINAMIMINATO HIGASHI, OSAKA-SHI<br>TEL : 06-6616-XXXX (REPRESENTATIVE) FAX : 06-6616-XXXX<br>BUSINESS AREAS: SHIGA,KYOTO,OSAKA,HYOUGO,NARA,WAKAYAMA | DEALER | 206g |
| CHUGOKU BRANCH | POSTAL CODE : 730-00XX<br>ADDRESS : NAKA-KU MOTOMACHI, HIROSHIMA-SHI<br>TEL : 082-223-XXXX (REPRESENTATIVE) FAX : 082-222-XXXX<br>BUSINESS AREAS: TOTTRI,SHIMANE,OKAYAMA,HIROSHIMA,YAMAGUCHI | DEALER | 206h |
| SHIKOKU BRANCH | POSTAL CODE : 760-00XX<br>ADDRESS : CHUOUCHOU, TAKAMATSU-SHI<br>TEL : 087-831-XXXX (REPRESENTATIVE) FAX : 087-836-XXXX<br>BUSINESS AREAS: TOKUSHIMA,KAGAWA,EHIME,KOUCHI | DEALER | 206i |
| KYUSHU BRANCH | POSTAL CODE : 814-85XX<br>ADDRESS : HAYARA-KU, HYAKUDOUHAMA, FUKUOKA-SHI<br>TEL : 092-852-XXXX (REPRESENTATIVE) FAX : 092-844-XXXX<br>BUSINESS AREAS: FUKUOKA,SAGA,NAGASAKI,KUMAMOTO,OITA,MIYAZAKI KAGOSHIMA,OKINAWA | DEALER | 206j |

[RETURN]

FIG. 9

◎◎HOME | SEARCH |

DEALERS BELONGING TO CHUGOKU BRANCH

| TOTTORI | SHIMANE | OKAYAMA | HIROSHIMA | YAMAGUCHI |

TOTTORI

| DEALER NAME | BUSINESS OFFICE | TEL | ADDRESS |
|---|---|---|---|
| TOTTORI ○△ (K.K) | HEADQUARTER | 0857-22-XXXX | TOTTORI-SHI |
| | YONAGO BRANCH | 0859-22-XXXX | YONAGO-SHI |

SHIMANE

| DEALER NAME | BUSINESS OFFICE | TEL | ADDRESS |
|---|---|---|---|
| □□DENKI (K.K.) | HEADQUARTER | 0852-26-XXXX | MATSUE-SHI |
| | ANRAI | 0854-23-XXXX | ANRAI-SHI |
| | HAMADA | 0855-23-XXXX | HAMADA-SHI |
| | OKI | 08512-2-XXXX | OKI-SHI |

OKAYAMA

| DEALER NAME | BUSINESS OFFICE | TEL | ADDRESS |
|---|---|---|---|
| △□DENKI (K.K.) | HEADQUARTER | 086-263-XXXX | OKAYAMA-SHI |
| △△DENKI (K.K.) | CHUGOKU BRANCH OKAYAMA | 086-422-XXXX | KURASHIKI-SHI |
| | CHUGOKU BRANCH TSUYAMA | 0868-22-XXXX | TSUYAMA-SHI |

HIROSHIMA

| DEALER NAME | BUSINESS OFFICE | TEL | ADDRESS |
|---|---|---|---|
| (K.K.) HIROSHIMA◎◎ | HEADQUARTER | 086-284-XXXX | AKI-GUN |
| | FUKUYAMA BRANCH | 0849-23-XXXX | FUKUYAMA-SHI |
| △△DENKI (K.K.) | CHUGOKU BRANCH | 082-247-XXXX | HIROSHIMA-SHI |
| | CHUGOKU BRANCH KURE | 0823-24-XXXX | KURE-SHI |

YAMAGUCHI

| DEALER NAME | BUSINESS OFFICE | TEL | ADDRESS |
|---|---|---|---|
| ○□SHOJI (K.K.) | HEADQUARTER | 0833-41-XXXX | SHIMOMATSU-SHI |
| YAMAGUCHI □△DENKI (K.K.) | HEADQUARTER | 083-972-XXXX | YOSHIKI-GUN |
| | IWAKUNI | 0827-21-XXXX | IWAKUNI-SHI |
| △△DENKI (K.K.) | CHUGOKU BRANCH TOKUYAMA | 0834-21-XXXX | TOKUYAMA-SHI |

[RETURN]

FIG. 12

◎◎ SUPER-ENERGY-SAVED TRANSFORMER   Super△△△△△△

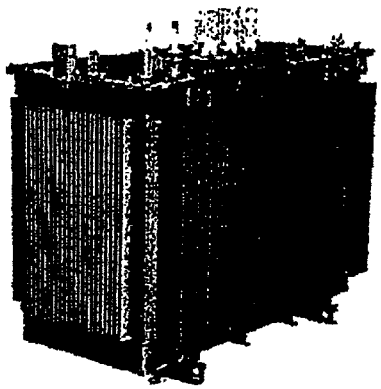

TOTAL LOSS ABOUT 1/2, SUPER-ENERGY-SAVED TRANSFORMER DEMANDED BY OUR AGE

ELECTRIC ENERGY IS A MUST IN INDUSTRIES AND LIVINGS A TRANSFORMER FOR ELECTRICITY RECEPTION AND DISTRIBUTION FOR SUPPORTING OUR ELECTRICITY USE IS REQUIRED TO HAVE A HIGH ENERGY CONVERSION EFFICIENCY

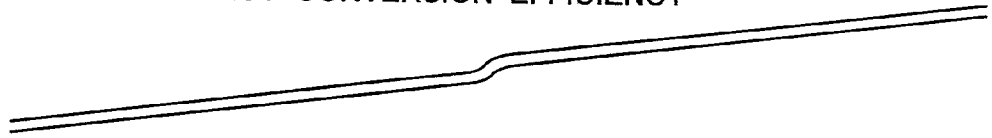

■ FEATURES:

1. REMARKABLY REDUCED "NO-LOAD LOSS" AND "LOAD LOSS" AND REALIZATION OF "ENERGY SAVING" AND "MINIMUM RUNNING COST"
2. IMPROVED WINDING STRUCTURE OF EMPLOYING CORE MADE OF AMORPHOUS ALLOY ENABLED REDUCTION OF TOTAL LOSS BY ABOUT 50% (WHEN COMPARED TO EXISTING STANDARD)
3. MERIT OBTAINED BY THE ATOM ARRAY STRUCTURE OF AMORPHOUS ALLOY APPLIED TO THE CORE OF THE TRANSFORMER

● AIMING AT EARTH-FRIENDRY ENTERPRISE, WE ◎◎ PROPOSES ENERGY SAVING

● WHEN YOU HAVE "RENEWAL" OR "NEW INSTALLATION" TO SUPER-ENERGY-SAVED TRANSFORMER IN MIND, PLEASE CLICK ONE OF FOLLOWING MENUS ?

[RENEWAL]   [NEW INSTALLATION]

FIG. 13

[CUSTOMERS]

★ OUR COMPANY IS △△◎◎, A GENERAL DEALER OF (K.K.) ◎◎ WORKS

★ WE RECEIVED MANY MESSAGES SAYING "I AM EXAMINING" RENEWAL TOWARD SUPER-ENERGY-SAVED TRANSFORMER" THANKS FOR YOUR ORDER

★ IN OUR (K.K.) ◎◎ WORKS, IN ORDER THAT CUSTOMERS CAN WELL APPRECIATE ECONOMICAL EFFECTS BASED ON "RENEWAL" AND SUPPORT CUSTOMERS' ENVIRONMENTAL MANAGEMENT (ISO14001 STANDARD), WE CONDUCT FOUR STEPS WHICH FOLLOW

| FIRST STEP : GRASPING POWER USE CONDITION |

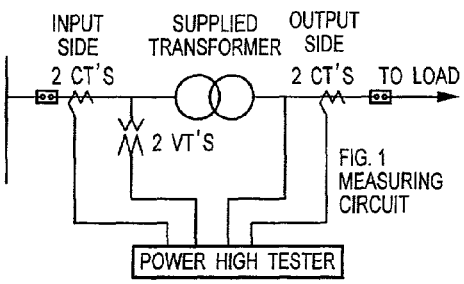

- INSTALLATION AND WIRING OF MEASURING CIRCUIT OF FIG. 1 TO MEASURE LOAD FACTOR, TRANSFORMER LOSS, ETC.
- THE INSTALLATION AND WIRING IS DONE BY ENGINEERS OF (K.K) ◎◎ WORKS, □□ FACTORY

| SECOND STEP : PROPOSAL OF TRANSFORMER RENEWAL |

- AFTER MEASURING YOUR POWER USE CONDITION IN ABOUT 2 WEEKS, WE WILL SUGGEST THE TRANSFORMER OPTIMUM RENEWAL PROPOSAL ON THE BASIS OF THE MEASUREMENTS AND INFORMS YOU OF ITS ECONOMICAL AND ENVIRONMENTAL EFFECTS.

| THIRD STEP : YOUR JUDGEMENT OF RENEWAL |

- PLEASE JUDGE OUR RENEWAL PROPOSAL

| FOURTH STEP : SETTING OF INSTALLATION DATE/ADVICES FOR CALCULATION OF $CO_2$ REDUCTION AMOUNT, ETC. |

- LET ME ADVISE THE SETTING OF THE INSTALLATION DATE OF THE SUPER-ENERGY-SAVED TRANSFORMER AND THE CALCULATION OF REDUCED POWER AMOUNT AND $CO_2$ AMOUNT AFTER RENEWAL

★ IF YOU ANSWER FOLLOWING QUESTIONS AND CLICK "SEND", THEN (K.K.). ◎◎ WORKS, □□ FACTORY WILL CONTACT YOU ABOUT DETAILS OF THE FIRST STEP

① WHAT IS SPECIFICATIONS OF YOUR TRANSFORMER NOW IN USE

| CAPACITY | PHASE NUMBER | PRIMARY VOLTAGE | SECONDAY VOLTAGE | NUMBER OF TRANSFORMERS | MANUFACTURED YEAR | MANUFACTURE |
|---|---|---|---|---|---|---|
| ▼ | ▼ | ▼ | ▼ | ▼ | ▼ | ▼ |
| ▼ | ▼ | ▼ | ▼ | ▼ | ▼ | ▼ |
| ▼ | ▼ | ▼ | ▼ | ▼ | ▼ | ▼ |
| ▼ | ▼ | ▼ | ▼ | ▼ | ▼ | ▼ |
| ▼ | ▼ | ▼ | ▼ | ▼ | ▼ | ▼ |

② ABOUT 4 HOURS OF "POWER FAILURE" IS REQUIRED FOR THE INSTALLATION AND WIRING OF THE MEASURING CIRCUIT POSSIBLE ?  YES● NO○

③ WHEN IS YOUR DESIRED DATE FOR THE INSTALLATION AND WIRING OF THE MEASURING CIRCUIT ?  ▼

[SEND] [CANCEL]

FIG. 14A

| CAPACITY |
|---|
| 50kVA △ |
| 75kVA |
| 100kVA |
| 150kVA |
| 200kVA |
| 300kVA |
| 500kVA |
| 750kVA |
| 1000kVA |
| 1500kVA |
| 2000kVA ▽ |

FIG. 14B

| PHASE NUMBER |
|---|
| 3 PHASE △ |
| SINGLE PAHSE ▽ |

FIG. 14C

| PRIMARY VOLTAGE |
|---|
| 3150V △ |
| 3300V |
| 6300V |
| 6600V ▽ |

FIG. 14D

| SECONDARY VOLTAGE |
|---|
| 210V △ |
| 220V |
| 415V |
| 420V |
| 440V ▽ |

FIG. 14E

| TRANSFORMER NUMBER |
|---|
| 1 △ |
| 2 |
| 3 |
| 4 |
| 5 |
| 6 |
| 7 |
| 8 ▽ |

FIG. 14F

| MANUFACTURED YEAR |
|---|
| BEFORE 1970 △ |
| 1971 |
| 1972 |
| 1973 |
| 1974 |
| 1975 |
| 1976 |
| 1977 |
| 1978 |
| 1979 |
| 1980 |
| 1981 |
| 1982 |
| 1983 |
| 1984 |
| 1985 ▽ |

FIG. 14G

| MANUFACTURER |
|---|
| ◎◎ △ |
| A |
| B |
| C |
| D |
| E |
| F |
| G |
| H ▽ |

FIG. 14H

| INSTALLATION/WIRING DATE OF MEASURING CIRCUIT |
|---|
| 2001. 10. 1 △ |
| 2001. 10. 2 |
| 2001. 10. 3 |
| 2001. 10. 4 |
| 2001. 10. 5 |
| 2001. 10. 6 |
| 2001. 10. 7 |
| 2001. 10. 8 |
| 2001. 10. 9 |
| 2001. 10. 10 |
| 2001. 10. 11 |
| 2001. 10. 12 |
| 2001. 10. 13 |
| 2001. 10. 14 |
| 2001. 10. 15 |
| 2001. 10. 16 ▽ |

FIG. 15

[CUSTOMERS]

★ OUR COMPANY IS △△○◎, A GENERAL DEALER OF (K.K.) ○◎ WORKS

★ WE RECEIVED MESSAGE SAYING "I AM EXAMINING" RENEWAL TOWARD SUPER-ENERGY-SAVED TRANSFORMER" THANKS FOR YOUR ORDER

★ IN OUR (K.K.) ○◎ WORKS, IN ORDER THAT CUSTOMERS CAN WELL APPRECIATE ECONOMICAL EFFECTS BASED ON "RENEWAL" AND SUPPORT CUSTOMERS' ENVIRONMENTAL MANAGEMENT (ISO14001 STANDARD), WE CONDUCT FOUR STEPS WHICH FOLLOW

| FIRST STEP : GRASPING POWER USE CONDITION |

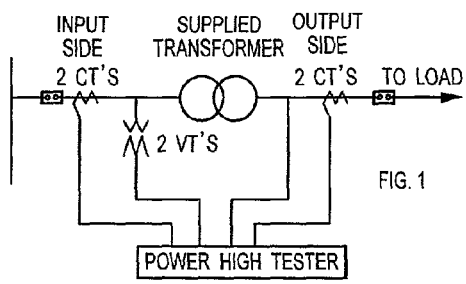

- INSTALLATION AND WIRING OF MEASURING CIRCUIT OF FIG. 1 TO MEASURE LOAD FACTOR, TRANSFORMER LOSS, ETC.
- THE INSTALLATION AND WIRING IS DONE BY ENGINEERS OF (K.K) ○◎ WORKS, □□ FACTORY

| SECOND STEP : PROPOSAL OF TRANSFORMER RENEWAL |

- AFTER MEASURING YOUR POWER USE CONDITION IN ABOUT 2 WEEKS, WE WILL SUGGEST THE TRANSFORMER OPTIMUM RENEWAL PROPOSAL ON THE BASIS OF THE MEASUREMENTS AND INFORMS YOU OF ITS ECONOMICAL AND ENVIRONMENTAL EFFECTS.

| THIRD STEP : YOUR JUDGEMENT OF RENEWAL |

- PLEASE JUDGE OUR RENEWAL PROPOSAL

| FOURTH STEP : SETTING OF INSTALLATION DATE/ADVICES FOR CALCULATION OF $CO_2$ REDUCTION AMOUNT, ETC. |

- LET ME ADVISE THE SETTING OF THE INSTALLATION DATE OF THE SUPER-ENERGY-SAVED TRANSFORMER AND THE CALCULATION OF REDUCED POWER AMOUNT AND $CO_2$ AMOUNT AFTER RENEWAL

★ IF YOU ANSWER FOLLOWING QUESTIONS AND CLICK "SEND", THEN (K.K.). ○◎ WORKS, □□ FACTORY WILL CONTACT YOU ABOUT DETAILS OF THE FIRST STEP

① WHAT IS SPECIFICATIONS OF YOUR TRANSFORMER NOW IN USE

| CAPACITY | PHASE NUMBER | PRIMARY VOLTAGE | SECONDAY VOLTAGE | NUMBER OF TRANSFORMERS | MANUFACTURED YEAR | MANUFACTURE |
|---|---|---|---|---|---|---|
| 50kVA | SINGLE PHASE | 3150V | 210V | 2 | 1978 | ○◎ |
| 500kVA | 3 PHASE | 6600V | 210V | 2 | 1975 | ○◎ |
| 1000kVA | 3 PHASE | 6600V | 210V | 4 | 1975 | ○◎ |
|  |  |  |  |  |  |  |
|  |  |  |  |  |  |  |

② ABOUT 4 HOURS OF "POWER FAILURE" IS REQUIRED FOR THE INSTALLATION AND WIRING OF THE MEASURING CIRCUIT POSSIBLE ?   YES● NO○

③ WHEN IS YOUR DESIRED DATE FOR THE INSTALLATION AND WIRING OF THE MEASURING CIRCUIT ?   2001.10.20

[SEND]  [CANCEL]

FIG. 16

[CUSTOMERS]

★ WELCOME TO (K.K.) ◎◎ WORKS, □□ FACTORY !

★ THANKS FOR YOUR ORDER OF "RENEWAL TO SUPER-ENERGY-SAVED TRANSFORMER" FOR AN ACCEPTANCE TABLE BELOW

★ THANKS FOR YOUR CONTINUED PATRONAGE OF OUR TRANSFORMERS

| ORDER ACCEPTANCE TABLE FROM ☆☆ INDUSTRY (K.K.) | | | | | |
|---|---|---|---|---|---|
| DEALER NAME | HIROSHIMA : (K.K.) △△◎◎ | | | DATE ACCEPTED : 08 / 08 / 2001 | |
| ORDER | TRANSFORMER RENEWAL | | | ORDER No. : 34-056 | |
| | CAPACITY | PHASE No. | VOLTAGE | TRANSFORMER NUMBER | MANUFACTURED YEAR | MANUFACTURER |
| TRANSFORMER IN USE | 50kVA | SINGLE PHASE | 3150V/210V | 2 | 1978 | ◎◎ |
| | 500kVA | 3 PHASE | 6600V/210V | 2 | 1975 | ◎◎ |
| | 1000kVA | 3 PHASE | 6600V/210V | 1 | 1975 | ◎◎ |

| DESIRED DATE OF INSTALLATION / WIRING OF MEASURING CIRCUIT | 10 / 20 / 2001 |
|---|---|
| POWER FAILURE UPON INSTALLATION / WIRING OF MEASURING CIRCUIT | POSSIBLE |

★ AS A RESULT OF SCHEDULE CONFIRMATION BY OUR FACTORY ENGINEERS, WE ACCEPTED 10 / 20 (Sa.), 2001 AS YOU WISH

★ IN ORDER TO PROMOTE SMOOTH INSTALLATION / WIRING OF THE MEASURING CIRCUIT, WE WOULD LIKE TO CONTACT YOU ABOUT PREVIOUS INSPECTION OF YOUR TRANSFORMERS (ON-THE-SPOT CONFIRMATION AND BRIEF ARRANGEMENT). I WOULD LIKE TO BE APPRECIATED FOR YOUR "SEND" BY OCTOBER 1ST

① PLEASE ENTER YOUR DESIRED DATE FOR PREVIOUS INSPECTION
- FIRST PREFERENCE  ▼ ▼
- SECOND PREFERENCE ▼ ▼
- THIRD PREFERENCE  ▼ ▼

② PLEASE ENTER YOUR ADDRESS / COMPANY NAME / PERSON TO BE CONTACTED / TELEPHONE NUMBER

| ADDRESS TO BE VISITED | |
|---|---|
| COMPANY NAME | |
| PERSON TO BE CONTACT | |
| TELEPHONE NUMBER | |

③ YOUR TRANSFORMER IN USE INSTALLED INDOORS OR OUTDOORS ?     INDOORS● OUTDOORS○

④ THE MEASURING CIRCUIT IS OF AN INDOORS INSTALLATION TYPE . INDOORS INSTALLATION POSSIBLE ?     YES● NO ○

[SEND] [CANCEL]

FIG. 17A

| PREVIOUS INSPECTION DATE |
|---|
| 2001. 10. 07 |
| 2001. 10. 08 |
| 2001. 10. 09 |
| 2001. 10. 10 |
| 2001. 10. 11 |
| 2001. 10. 12 |
| 2001. 10. 13 |

FIG. 17B

| TIME |
|---|
| 09 : 00~10 : 30 |
| 10 : 00~11 : 30 |
| 11 : 00~12 : 30 |
| 13 : 00~14 : 30 |
| 14 : 00~15 : 30 |
| 15 : 00~16 : 30 |
| 16 : 00~17 : 30 |

[CUSTOMERS]

★ WELCOME TO (K.K.) ◎◎ WORKS, □□ FACTORY !

★ THANKS FOR YOUR ORDER OF "RENEWAL TO SUPER-ENERGY-SAVED TRANSFORMER" FOR AN ACCEPTANCE TABLE BELOW

★ THANKS FOR YOUR CONTINUED PATRONAGE OF OUR TRANSFORMERS

| ORDER ACCEPTANCE TABLE FROM ☆☆ INDUSTRY (K.K.) | | | | | |
|---|---|---|---|---|---|
| DEALER NAME | HIROSHIMA : (K.K.) △△◎◎ | | | DATE ACCEPTED: 08 / 08 / 2001 | |
| ORDER | TRANSFORMER RENEWAL | | | ORDER No. : 34-056 | |

| | CAPACITY | PHASE No. | VOLTAGE | TRANSFORMER NUMBER | MANUFACTURED YEAR | MANUFACTURER |
|---|---|---|---|---|---|---|
| TRANSFORMER IN USE | 50kVA | SINGLE PHASE | 3150V/210V | 2 | 1978 | ◎◎ |
| | 500kVA | 3 PHASE | 6600V/210V | 2 | 1975 | ◎◎ |
| | 1000kVA | 3 PHASE | 6600V/210V | 1 | 1975 | ◎◎ |

| DESIRED DATE OF INSTALLATION / WIRING OF MEASURING CIRCUIT | 10 / 20 / 2001 |
|---|---|
| POWER FAILURE UPON INSTALLATION / WIRING OF MEASURING CIRCUIT | POSSIBLE |

★ AS A RESULT OF SCHEDULE CONFIRMATION BY OUR FACTORY ENGINEERS, WE ACCEPTED 10 / 20 (Sa.), 2001 AS YOU WISH

★ IN ORDER TO PROMOTE SMOOTH INSTALLATION / WIRING OF THE MEASURING CIRCUIT, WE WOULD LIKE TO CONTACT YOU ABOUT PREVIOUS INSPECTION OF YOUR TRANSFORMERS (ON-THE-SPOT CONFIRMATION AND BRIEF ARRANGEMENT). I WOULD LIKE TO BE APPRECIATED FOR YOUR "SEND" BY OCTOBER 1ST

① PLEASE ENTER YOUR DESIRED DATE FOR PREVIOUS INSPECTION
- FIRST PREFERENCE [2001.10.12 ▼] [15:00~ ▼]
- SECOND PREFERENCE [2001.10.10 ▼] [10:00~ ▼]
- THIRD PREFERENCE [2001.10.09 ▼] [15:00~ ▼]

② PLEASE ENTER YOUR ADDRESS / COMPANY NAME / PERSON TO BE CONTACTED / TELEPHONE NUMBER

| ADDRESS TO BE VISITED | ◎△-CHO XXXX BANCHI, □□-SHI HIROSHIMA |
|---|---|
| COMPANY NAME | ☆☆ INDUSTRY (K.K.), □□ FACTORY |
| PERSON TO BE CONTACT | ☆☆ INDUSTRY (K.K.), POWER DEPART., △△ JIRO |
| TELEPHONE NUMBER | XXX-XXX-XXXX |

③ YOUR TRANSFORMER IN USE INSTALLED INDOORS OR OUTDOORS ? [INDOORS● OUTDOORS○]

④ THE MEASURING CIRCUIT IS OF AN INDOORS INSTALLATION TYPE . INDOORS INSTALLATION POSSIBLE ? [YES●　NO○]

[SEND] [CANCEL]

☆☆ INDUSTRY (K.K.) POWER DEPART., Mr. △△ JIRO

★THIS IS (K.K.) ◎◎ WORKS, □□ FACTORY
★SURELY ACCEPTED YOUR CONTACT DATED ON 08 / 16 / 2001 REGARDING PREVIOUS INSPECTION FOR YOUR ORDER OF "RENEWAL TO SUPER-ENERGY- SAVED TRANSFORMER"

402a

| ORDER ACCEPTANCE TABLE FROM ☆☆ INDUSTRY (K.K.) |||||||
|---|---|---|---|---|---|---|
| DEALER NAME | HIROSHIMA : (K.K.) △△◎◎ ||||| DATE ACCEPTED : 08 / 08 / 2001 |
| ORDER | TRANSFORMER RENEWAL ||||| ORDER No. : 34-056 |
| | CAPACITY | PHASE No. | VOLTAGE | TRANSFORMER NUMBER | MANUFACTURED YEAR | MANUFACTURER |
| TRANSFORMER IN USE | 50kVA | SINGLE PHASE | 3150V/210V | 2 | 1978 | ◎◎ |
| | 500kVA | 3 PHASE | 6600V/210V | 2 | 1975 | ◎◎ |
| | 1000kVA | 3 PHASE | 6600V/210V | 1 | 1975 | ◎◎ |
| DESIRED DATE OF INSTALLATION / WIRING OF MEASURING CIRCUIT ||||| 10 / 20 / 2001 ||
| POWER FAILURE UPON INSTALLATION / WIRING OF MEASURING CIRCUIT ||||| POSSIBLE ||

402b

| PREVIOUS INSPECTION ACCEPTANCE TABLE | DATE ACCEPTED : 2001.08.16 |
|---|---|
| PREVIOUS INSPECTION DATE | 10 / 12 / 2001 15:00~16:00 |
| VISITING PLACE | ☆☆ INDUSTRY (K.K.) LOCATED AT ○△-CHO, XXXX BANCHI, □□-SHI, HIROSHIMA |
| PERSON TO BE CONTACTED | ☆☆ INDUSTRY (K.K.), POWER DEPART. Mr. △△ JIRO |
| TELEPHONE NUMBER | XXX-XXX-XXXX |

★ AS TO PREVIOUS INSPECTION DATE, AS A RESULT OF SCHEDULE CONFIRMATION BY ENGINEERS OF OUR COMPANY, WE ACCEPTED YOUR FIRST PREFERENCE: 10 / 12 (Fri.) / 2001, 15:00-16:30
★ △△ JIRO AT POWER DEPART. OF OUR COMPANY WILL VISIT

402c

★ FOR LATER CONTACT WITH OUR COMPANY, PLEASE CONTACT THE FOLLOWING ADDRESS
  MAIL ADDRESS : XXXX@XX.XXXXXX.XXXXXXX.XX.XX
  TEL : XXX-XXX-XXXX    FAX : XXX-XXX-XXXX

EXAMPLE OF MEASURED RESULTS AT TRANSFORMER INPUT/OUTPUT SIDES.

| MEASUREMENT DATE | INPUT SIDE (AVERAGE PER DAY) | | | | OUTPUT SIDE (AVERAGE PER DAY) | | | | |
|---|---|---|---|---|---|---|---|---|---|
| | VOLTAGE (V) U12 | CURRENT (A) I12 | EFFECTIVE POWER (W) P12 | POWER FACTOR PF12 | VOLTAGE (V) U34 | CURRENT (A) I34 | LOAD FACTOR | EFFECTIVE POWER (W) P34 | POWER FACTOR PF34 |
| 2000/12/18 (Mon.) | 6597 | 49.74 | 412,870 | 0.710 | 3407 | 90.67 | 0.526 | 406,943 | 0.745 |
| 19 (Tue.) | 6643 | 47.00 | 384,072 | 0.696 | 3434 | 85.17 | 0.499 | 378,323 | 0.735 |
| 20 (Wed.) | 6635 | 48.01 | 392,243 | 0.702 | 3428 | 87.22 | 0.510 | 386,373 | 0.740 |
| 21 (Thurs.) | 6635 | 48.00 | 390,984 | 0.695 | 3428 | 87.19 | 0.511 | 385,065 | 0.731 |
| 22 (Fri.) | 6640 | 37.51 | 300,676 | 0.694 | 3442 | 67.13 | 0.407 | 295,577 | 0.740 |
| 25 (Mon.) | 6582 | 24.75 | 192,568 | 0.575 | 3425 | 42.71 | 0.280 | 188,427 | — |
| 26 (Tue.) | 6628 | 31.45 | 247,225 | 0.683 | 3442 | 55.56 | 0.320 | 242,748 | 0.731 |
| 27 (Wed.) | 6639 | 31.70 | 248,380 | 0.681 | 3447 | 55.96 | 0.323 | 243,858 | 0.729 |
| 28 (Thurs.) | 6634 | 27.91 | 207,457 | 0.475 | 3449 | 48.15 | 0.344 | 202,873 | — |

| ☆☆ INDUSTRY (K.K.) POWER DEP., Mr. △△ JIRO | 2001.11.5 (K.K.) ◎◎ WORKS, □□ FACTORY △△ DEPARTMENT, Mr. ○○ TARO |
|---|---|

RE : PROPOSAL TO "RENEWAL TOWARD SUPER-ENERGY-SAVED TRANSFORMER"

AS A RESULT OF OUR MEASUREMENT OF YOUR POWER USE CONDITION THROUGH 2 WEEKS FROM 10/22/2001 TO 11/02/2001, WE SUGGEST THE OPTIMUM RENEWAL PROPOSAL AS FOLLOWS THREE FEATURES OF THE RENEWAL ARE AS FOLLOWS. PLEASE EXAMINE IT

REMARKS:

1. RENEWAL FEATURES
   (1) AS OUR EXAMINATION OF TRANSFORMER COMBINATION, 5 TRANSFORMERS CAN BE COMBINED INTO 3 TRANSFORMERS
   (2) THE RENEWAL TO OUR SUPER-ENERGY-SAVED TRANSFOMER ENABLES REDUCTION OF POWER AMOUNT TO XX.X MWh / YEAR AND ALSO REDUCTION OF POWER FEE TO XXX, 000 YEN / YEAR
   (3) ENVIRONMENTALLY REDUCTION OF $CO_2$ TO XX.X T / YEAR CAN BE REALIZED

2. PROPOSAL TO RENEWAL

| TRANSFORMER | CURRENT STATE | | EXAMINED CONTENTS | OUR RENEWAL PROPOSAL |
|---|---|---|---|---|
| | CAPACITY | MAIN LOAD | | |
| No.1 | 50kVA | GENERAL POWER, OUTLET | ·SMALL LOAD<br>·SHIFT LOAD TO No.4 TRANSFORMER | COMBINE IT INTO No.4 TRANSFORMER |
| No.2 | 500kVA | DRYING FURNACE, PRESS, ILLUMINATOR, etc. | ·SMALL LOAD<br>·LESS INFLUENCED BY NOISE, VOLTAGE VARIATIONS | COMBINE INTO A SINGLE TRANSFORMER OF 500kVA |
| No.3 | 500kVA | | | |
| No.4 | 50kVA | GENERAL POWER, OUTLET | ·SMALL LOAD<br>·INCREASE CAPACITY INCLUDING PROSPECTED CAPACITY CORRESPONDING TO LOAD SHIFT OF No.1 TRANSFORMER | COMBINE INTO No.1 TRANSFORMER OF 75kVA |
| No.5 | 1000kVA | WELDING MACHINE PRESS, ILLUMINATOR, etc. | ·INTERMITTENT LOAD, SUFFICIENT CAPACUITY<br>·WORKABILITY IS NOT INFLUENCED EVEN BY CAPACITY REDUCTION | COMBINE INTO A SINGLE TRANSFORMER OF 750kVA |

3. WE ARE WAITING FOR YOUR CONTACT
   ○WANT TO PROCEED RENEWAL AS YOUR PROPOSAL. WANT KNOW MORE DETAILED EXPLANTION
   ○MY QUESTION IS AS FOLLOW. WAIT FOR YOUR REPLY

[SEND]   [CANCEL]

FIG. 24

Mr. TARO SCHEDULE

| | 8 | 9 | 10 | 11 | 12 | 13 | 14 | 15 | 16 | 17 |
|---|---|---|---|---|---|---|---|---|---|---|
| 2001.10.08 (Mon.) | | | FACTORY MEETING | | | | | | | |
| 2001.10.09 (Tue.) | | | | | | | | | | |
| 2001.10.10 (Wed.) | | | | | | | MOVE | | | |
| 2001.10.11 (Thurs) | | KURASHIKI-SHI, OKAYAMA (COMPANY A) | | | | | OKAYAMA-SHI, OKAYAMA (COMPANY B) | | | |
| 2001.10.12 (Fri.) | | TSUYAMA-SHI, OKAYAMA (COMPANY C) | | | | | MOVE | | | |
| 2001.10.13 (Sat.) | | | | | | | | | | |
| 2001.10.14 (Sun.) | HOLIDAY | | | | | | | | | |
| 2001.10.15 (Mon.) | | MOVE | | | | | SHIMONOSEKI-SHI, YAMAGUCHI (COMPANY D) | | | |
| 2001.10.16 (Tue.) | | TOKUYAMA-SHI, YAMAGUCHI (COMPANY E) | | | | | MOVE | | | |
| 2001.10.17 (Wed.) | | | | | | | | | | |
| 2001.10.18 (Thurs) | | YONAGO-SHI, TOTTORI (COMPANY F) | | | | | TOTTORI-SHI, TOTTORI (COMPANY G) | | | |
| 2001.10.19 (Fri.) | | MOVE | | | | | | | | |
| 2001.10.20 (Sat.) | | | | | | | | | | |
| 2001.10.21 (Sun.) | HOLIDAY | | | | | | | | | |
| 2001.10.22 (Mon.) | | | | | | | | | | |
| 2001.10.23 (Tue.) | | MOVE | | | | | HIMEJI-SHI, HYOGO (COMPANY H) | | | |
| 2001.10.24 (Wed.) | | AIOI-SHI, HYOGO (COMPANY I) | | | | | AKO-SHI, HYOGO (COMPANY J) | | | |
| 2001.10.25 (Thurs) | | MOVE | | | | | | | | |
| 2001.10.26 (Fri.) | | | | | | | | | | |

METHOD FOR SUPPORTING THE ORDERS RECEIVED OF TRANSFORMER

BACKGROUND OF THE INVENTION

The present invention relates to methods for supporting the orders of a transformer and more particularly, to a method for supporting the orders of an amorphous transformer.

For the purpose of preventing global warming, various energy saving measures have been groped, studied and implemented in various fields.

After a transformer is installed by a power demander and a circuit breaker is once turned ON, it is few to frequently turn ON and OFF the transformer from the viewpoint of the life of the transformer itself and facilities. In the transformer, not only a load loss is generated by a load current flowing through the transformer when a load is imposed on the transformer, but a constant loss (no-load loss) is also generated constantly under a power receiving condition regardless of presence or absence of the load. Thus these losses are converted mainly to heat and become a wasteful output.

In order to reduce such losses, various improvements have been applied to the transformer. For example, there is known an amorphous transformer in which the core of the transformer is made of an amorphous alloy and a winding structure is improved to reduce a loss. The amorphous alloy is an amorphous solid which contains iron, boron and silicon as its raw materials and has a random structure of atoms randomly arranged. The alloy is obtained by abruptly cooling the solid from its melted state. When such an alloy is employed to the core, an energy loss (hysteresis loss) caused by magnetic flux passing through the core becomes low and the thickness of the laminates of the core can be made as thin as 0.03 mm, thus reducing an eddy current loss as well. When a transformer enabling realization of such an energy saving effect is employed, this also serves as a means for reducing the amount of $CO_2$, which is also environmentally advantageous.

It is highly demanded that such a transformer having the energy saving effect is spread and widely popular. And when the economical effect of the power demander obtained by its loss reduction as well as the environmental effect of $CO_2$ reduction can be quantitatively compared with those of an existing transformer being actually used, its large spread can be expected.

Meanwhile, communication sales based on the Internet or personal computer communications is getting popular in various fields. However, the means based on the communication sales has not been employed in the transactions of the transformer, because it is desirable to select a suitable transformer depending on customer's power demand or actual use condition, even when a transformer is newly installed (which will be also referred to as new installation, hereinafter) or when an existing transformer is replaced by a new one (which will also be referred to the renewal, hereinafter).

The reasons are estimated as follows. In the case of the transformer renewal, in particular, when an existing transformer being now used is replaced by a new one, the power demander cannot quantitatively know what degree of economical effect caused by the energy saving and what degree of $CO_2$ reduction when compared with the existing transformer, which leads to the fact that the demander cannot decide "transformer purchase". In order to know the above economical and environmental effects caused by the renewal, on the other hand, it is considered to install a measuring circuit to the transformer now being used, to measure the power use condition of the power demander (which will be referred to as the customer, hereinafter), and to find a quantitative numerical value. In this case, however, a series of communications of (1) customer's order "renewal", (2) installation of a measuring circuit and setting of date, place and personals required for previous inspection therefor, and (3) contact of a renewal proposal including its economical and environmental effects must be done especially promptly from the viewpoint of social demand of early realization of energy saving and $CO_2$ reduction.

SUMMARY OF THE INVENTION

It is therefore an object of the present invention to provide a method for supporting received orders of a transformer which, in order to widely and quickly spread the transformer having energy saving and environmental effects, can associate a sales department with a measurement department in charge of transformer measurement to quickly cope with a demand of a customer who accessed a WWW page of the sales department and to record the fact.

In accordance with an aspect of the present invention, the above object is attained by a method for supporting received orders of a transformer which includes the steps of issuing a first response including a desired inquiry of a customer relating to an installation date of a measuring circuit of the transformer from a sales department to the customer who accessed a web site of the sales department; and in response to a customer's reply to the first response, issuing a second response including the installation date of the measuring circuit of the transformer from a measurement department in charge of measurement of the transformer.

In accordance with another aspect of the present invention, there is provided a method for supporting received orders of a transformer which includes the steps of: issuing a first response including a desired inquiry of a customer relating to an installation date of a measuring circuit of the transformer from a sales department to the customer who accessed a web site of the sales department; in response to a customer's reply to the first response, issuing a second response including an inquiry of a customer's desired date relating to the installation date of the measuring circuit and to previous inspection of the installation of the measuring circuit from a measurement department in charge of measurement of the transformer; and in response to a customer's reply to the second response, issuing a third response including an implementation date of the previous inspection from the measurement department.

In accordance with a further aspect of the present invention, there is provided a method for supporting received orders of a transformer which includes the steps of: installing a measuring circuit to a customer's transformer; receiving an amount of power of the transformer in an actual operating state in the form of electronic data from the installed measuring circuit; and returning a renewal proposal of the customer's transformer on the basis of the received data.

BRIEF DESCRIPTION OF THE DRAWINGS

FIG. 2 is a diagram for explaining a communication sequence among a customer, business window, dealer, factory;

FIG. 3 shows one of WWW pages in a web site of the business window;

FIG. 4 shows other one of the WWW pages in the web site of the business window;

FIG. 5 shows other one of the WWW pages in the web site of the business window;

FIG. 7 shows other one of the WWW pages in the web site of the business window;

FIG. 8 shows other one of the WWW pages in the web site of the business window;

FIG. 9 shows other one of the WWW pages in the web site of the business window;

FIG. 12 shows other one of the WWW pages in the web site of the dealer;

FIG. 13 is an example of a response message to the dealer;

FIGS. 14A to 14H show examples of pull-down menus when the customer prepares a response document;

FIG. 15 is an example of a customer's response document;

FIG. 16 is an example of a first response message of a factory;

FIGS. 17A and 17B are examples of pull-down menus when the customer prepares a response document;

FIG. 18 shows an example of a customer's response document;

FIG. 19 is an example of a second response message of the factory;

FIG. 21 shows an example of measured data of a transformer as mean data per one of nine days;

FIG. 23 is an example of a third response message of the factory including a renewal proposal; and FIG. 24 shows a in-charge person/schedule as one in-charge person/schedule areas of various databases.

DESCRIPTION OF THE EMBODIMENTS

An embodiment of the present invention will be explained in detail by referring to the accompanying drawings.

Explanation will first be made by referring to FIG. 1 as to a network configuration of a system by which a method for supporting received orders of a transformer in accordance with the present invention is implemented.

On the customer side, there is provided a user terminal 10 which is connected to a public network 1 of computer communication (which will be referred to as the Internet, hereinafter). Installed in the user terminal 10 is WWW client search (browsing) software (which will be referred to as the WWW browser, hereinafter) which is necessary for using the world wide web (WWW).

Figure 1:
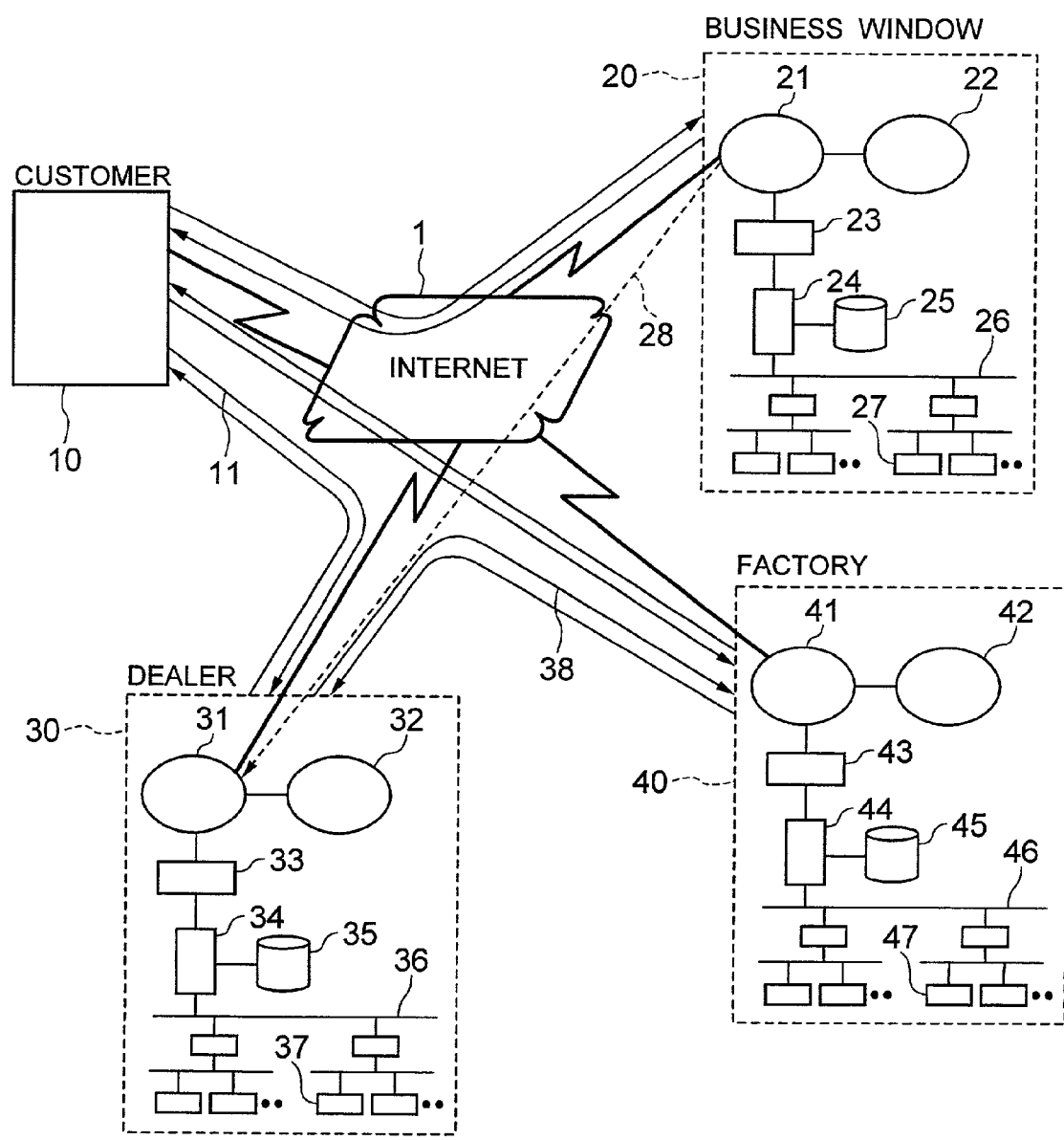
FIG. 1 is a network configuration of a system by which a method for supporting received orders of a transformer in accordance with the present invention is implemented.

In FIG. 1, a business window 20 opening its web site and a dealer 30 opening its web site are shown as examples of sales departments of the transformer. Although the number of such business windows 20 and the number of such dealers 30 are "1" respectively in FIG. 1, a plurality of such windows or dealers may be provided for each of business areas predeterminedly divided. Further, a single factory 40 is exemplified as a measurement department (measurements of input side voltage, input side current, output side voltage, output side current, load factor, and so on) of the transformer. Even in this case, however, the number of such factories is not limited to "1" as in the drawing. For example, the factory may be replaced by a service company having service branches in many areas. In the illustrated example, for the purpose of simplifying the explanation, the single business window 20 and the single dealer 30 are provided as the sales departments of the transformer, and the single factory 40 is provided as the measurement department of the transformer. And explanation will be made in connection with the aforementioned case.

A WWW server 21 connected to the Internet 1 is installed at the business window 20. The WWW server 21 is connected with a mail server 22 and also connected with a host computer 24 via a firewall 23. The host computer 24 is connected with a plurality of personal computers 27 via customer databases (DB's) 25 and a local area network (LAN) 26. The host computer 24, customer DB's 25 and personal computers 27 realizes a security policy by the firewall 23 in their internal network. Installed in the dealer 30 is a WWW server 31 which is connected at one side with the Internet 1 and also connected at another side with a mail server 32 and also connected at another side with a firewall 33. The firewall 33 in turn is connected with a host computer 34. The host computer 34 is connected at one side with a customer DB 35 and also connected at the other side with a plurality of personal computers 37 via a LAN 36. The host computer 34, customer DB 35 and personal computers 37 realize a security policy by the firewall 33 in their internal network.

Meanwhile, a WWW server 41 connected to the Internet 1 is installed in the factory 40. The WWW server 41 is connected at one side with a mail server 42 and also connected at the other side with a firewall 43. The firewall 43 in turn is connected with a host computer 44. The host computer 44 is connected at one side with various DB's 45 and also connected at the other side with a plurality of personal computers 47 via a LAN 46. The host computer 44, various DB's 45 and personal computers 47 realize a security policy by the firewall 43 in their internal network. In this connection, the various DB's 45 include at least "customer area", "in-charge person/schedule area" and "measured data area".

Figure 10:
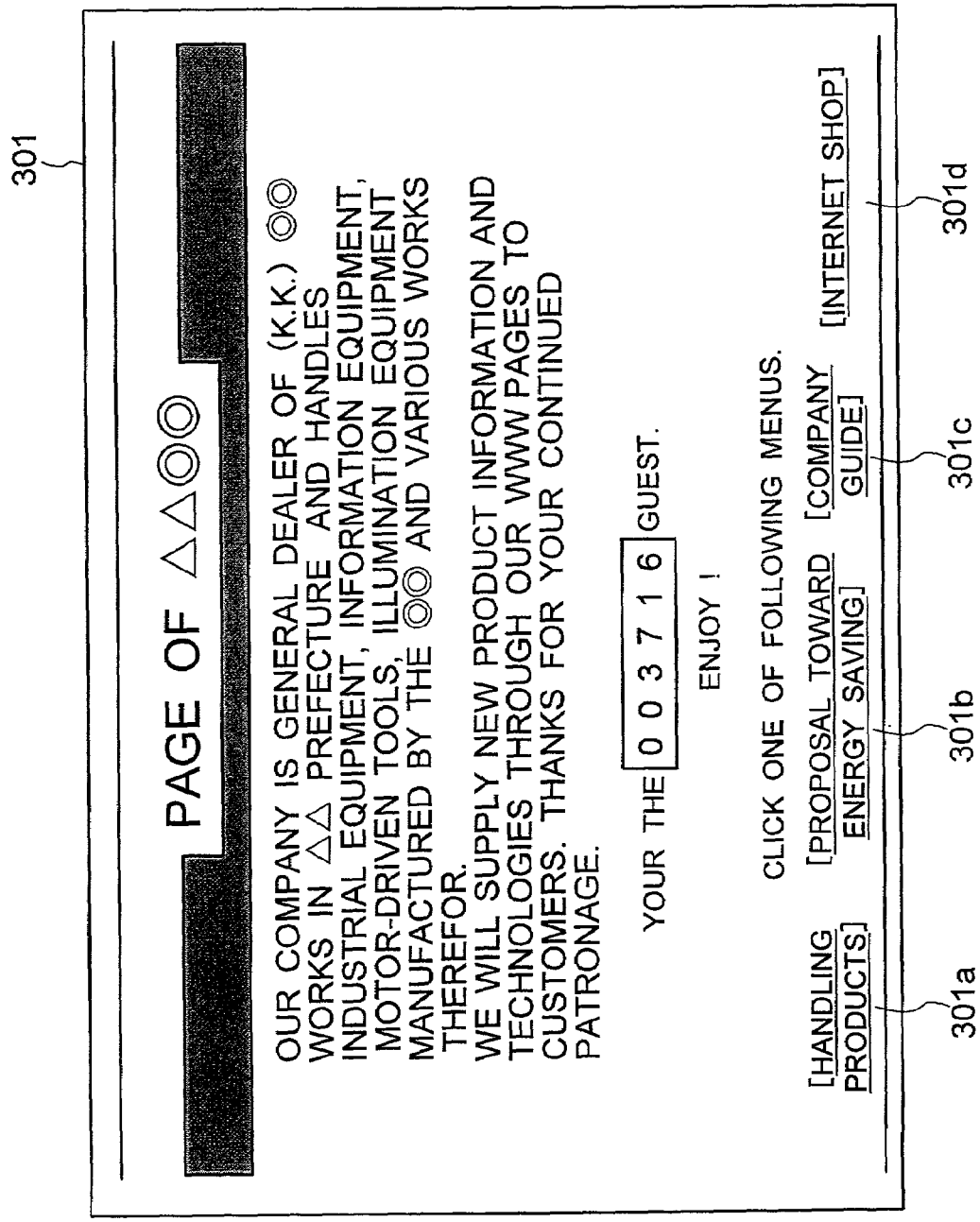
FIG. 10 shows exemplary one of WWW pages in a web site of a dealer.
Figure 11:
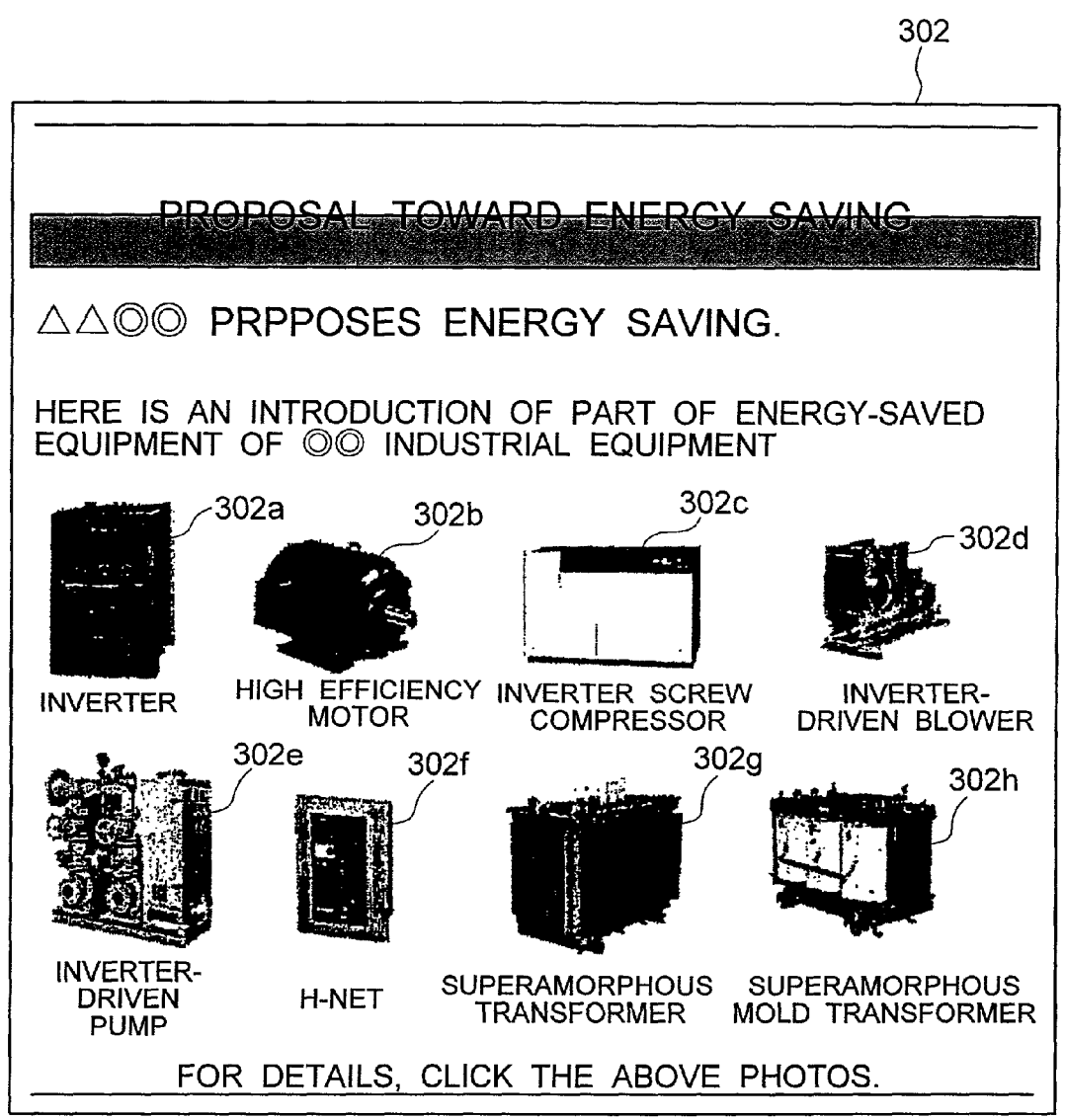
FIG. 11 shows other one of the WWW pages in the web site of the dealer.
Figure 20:
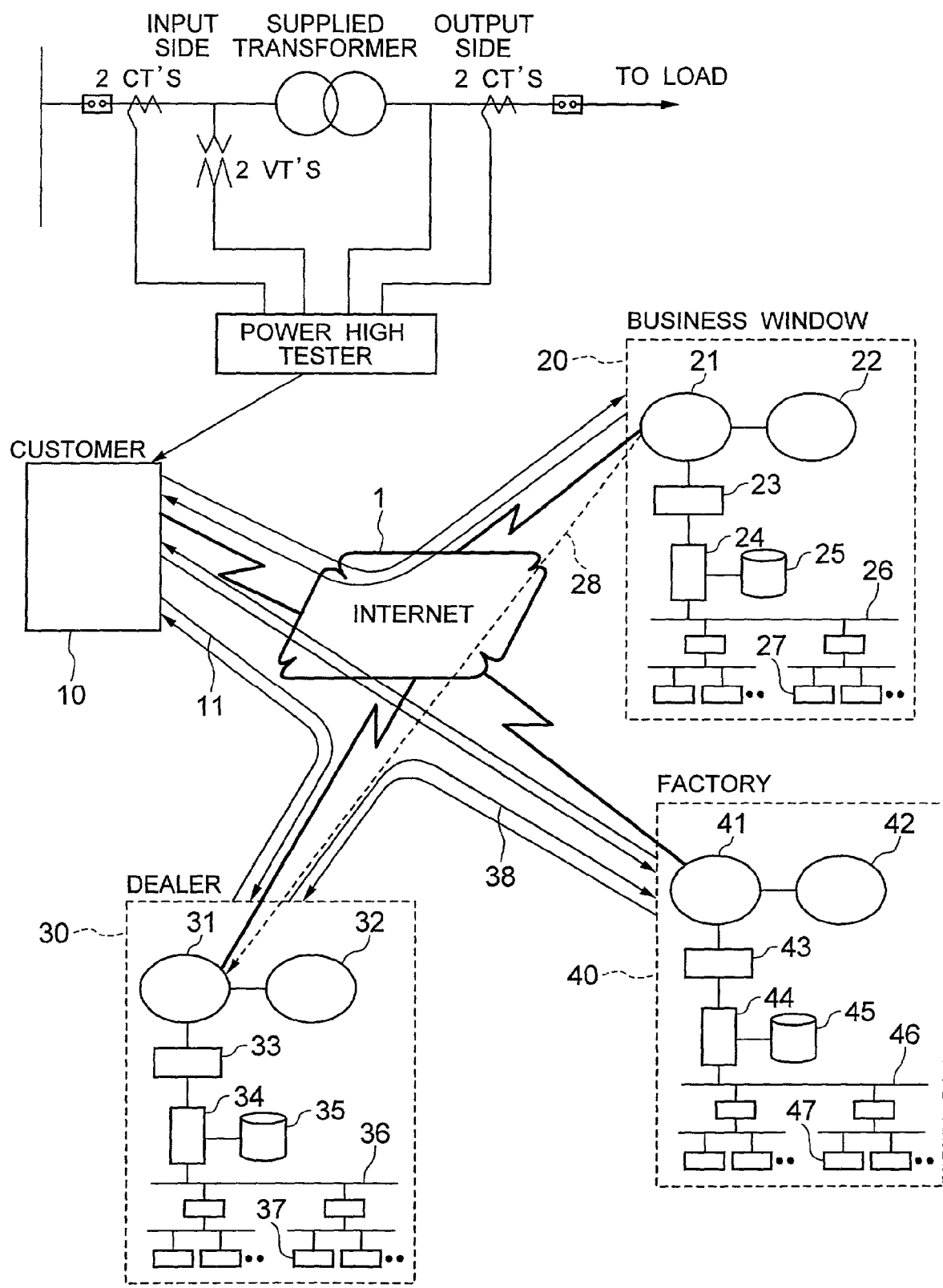
FIG. 20 shows an example of a measuring circuit when connected to the network configuration.
Figure 22:
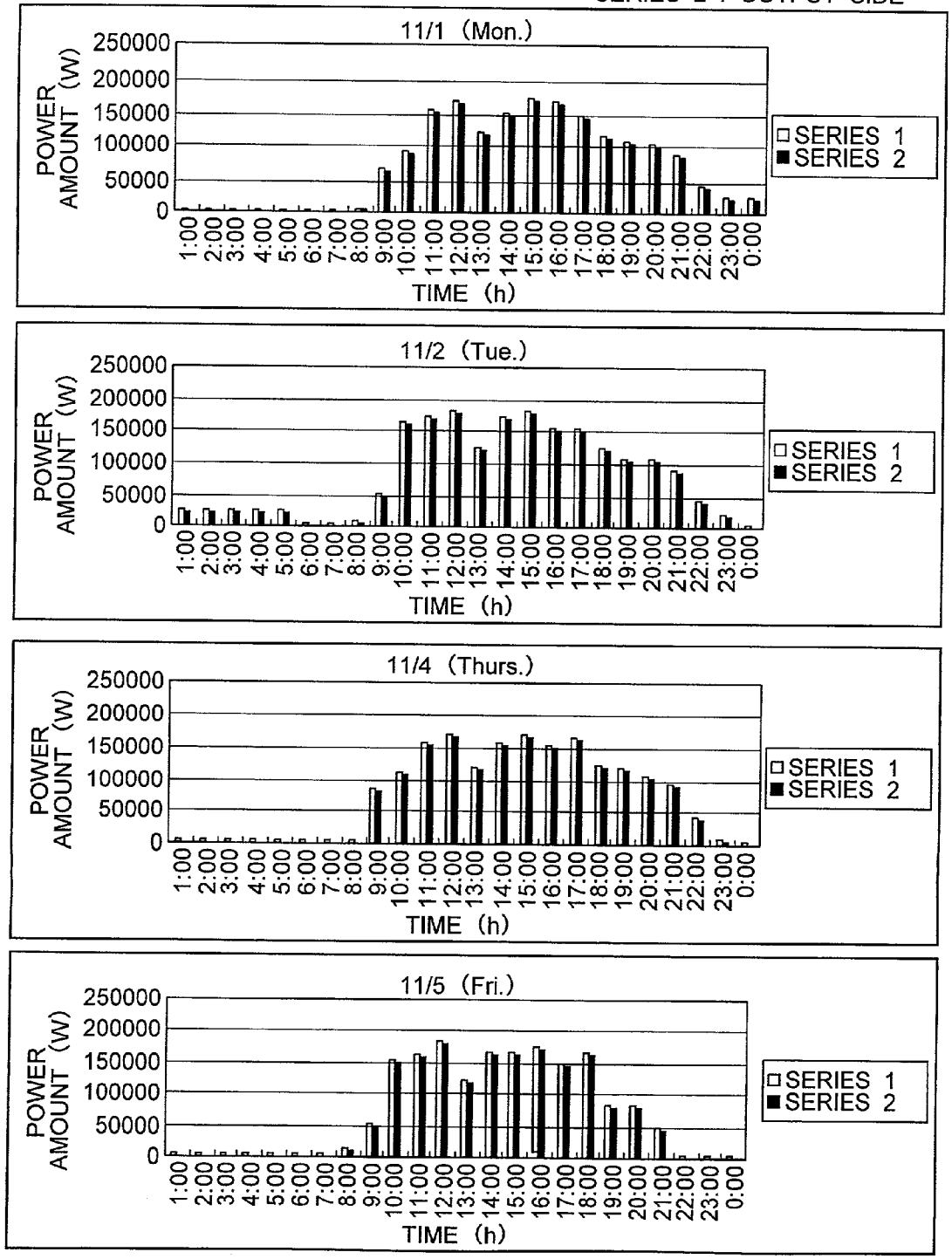
FIG. 22 shows day load curves for four days of the transformer.

A method for supporting received orders of a transformer in accordance with an embodiment of the present invention will be detailed with use of the network configuration of the transformer orders supporting system shown in FIG. 1, a communication sequence among the customer, business window, dealer and factory shown in FIG. 2, web site pages of the business window shown in FIGS. 3 to 9, web site pages of the dealer shown in FIGS. 10 to 12, a response message of the dealer shown in FIG. 13, a customer response document shown in FIG. 15, a first response message of the factory shown in FIG. 16, a customer response document shown in FIG. 18, a second response message of the factory shown in FIG. 19, a combination of a measuring circuit and a network configuration shown in FIG. 20, measured data shown in FIGS. 21 and 22, a third response message of the factory including a renewal proposal shown in FIG. 23, and an in-charge person/schedule as one of in-charge person/schedule areas in various DB's shown in FIG. 24.

When a customer first specifies the location URL (uniform resource locator) of the web site of the business window 20 to be first connected on the WWW browser of the user terminal 10, this causes the user terminal 10 to issue an information transfer request to the WWW server 21 having the specified URL. The WWW server 21, when receiving the request from the user terminal 10, transfers a HTML (HyperText Markup Language) source code of the specified web site to the user terminal. The user terminal 10, when receiving the source code, analyzes the source code and displays displayable information thereon. The customer, when finding a link such as an image link on the display, issues a request, and the WWW server 21 transfers an image in response to the request.

A series of such operations will be explained in connection with specific images shown in FIGS. 3 to 9. FIG. 3 shows a front page of the business window 20 in an electric company which manufactures and sells various industrial devices and equipment including the transformer. This page is information (of front page) 201 which was transferred from the business window 20 on the basis of a transfer request 101 issued from the user terminal 10. The page contains, as menus, various sorts of introduction files such as a "new product introduction" 201a, a "products-grouped-by-purpose introduction" 201b, an "energy saving proposal" 201c, a "products-grouped-by-type introduction" 201d and a "nationwide business windows" 201e as linked files. And when the customer, for example, clicks such a different-colored part, the user terminal 10 issues a request to the WWW server 21 having the corresponding information. The WWW server 21, when receiving the request, transfers the source code of a new specified page to the user terminal 10.

Figure 6:
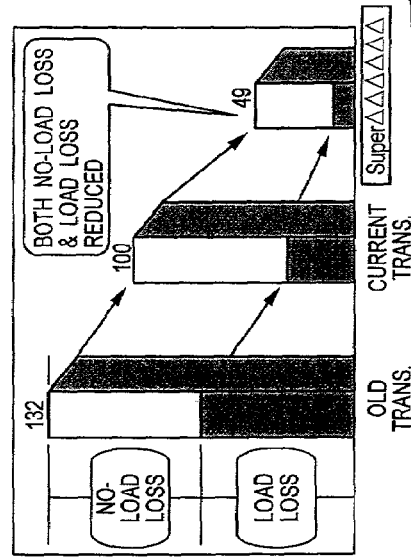
FIG. 6 shows other one of the WWW pages in the web site of the business window.

For example, when the customer, who wishes the transformer renewal, clicks a "transformer" 201dc in the "products-grouped-by-type introduction" 201d on the front page 201 of FIG. 3, such a "transformer" page 202 as shown in FIG. 4 is transferred to the user terminal 10. Through a series of such clicking operations, the customer can acquire new desired information. FIGS. 5, 6 and 7 show pages 203, 204 and 205 obtained when the customer clicks a "feature 1" 202a, "feature 2" 202b and "feature 3" 202c on the page of FIG. 4, respectively, introducing feature articles of the transformer.

When the customer now desires a transformer renewal through the introduction articles of the feature pages 203 to 205 of the transformer, he, on the basis of a message saying [For "new installation" or "renewal", contact a nearby "dealer".] given in bottom parts of the pages 202 to 205, clicks the "nationwide business windows" 201e on the front page 201 or one of "nationwide business windows" 202f, 203a, 204a and 205a on the pages 202 to 205. FIG. 8 shows a "business window" page 206 covering a group of branches from a "Hokkaido Branch" to a "Kyushu Branch". If the customer is located, e.g., in a business area belonging to a "Chugoku Branch", then he can click a "dealer" 206h to obtain such a page 207 of "Chugoku Branch area dealers" as shown in FIG. 9. Further, if the customer lives, e.g., in Hiroshima, then he can click one of two dealers 207e and 207f in Hiroshima, thus appearing a front page 301 of one dealer 30 as shown in FIG. 10.

Now a click of the dealer 207e or 207f causes the user terminal 10 to obtain a front page 301 of the dealer 30 of FIG. 10 following the page 207 of FIG. 9. This information transfer is carried out by an information link 28 apparently shown by a dashed line in FIG. 1. In actuality, however, this results from the user terminal 10 who issues such an information request as shown by a solid line 11 to the WWW server 31 of the dealer 30. Such a hyperlink structure is one of WWW features and results from the fact that the URL of the linked information is also included in data actually transferred and displayed. And when the operator clicks a differently-colored part with use of a mouse, this causes a transfer request to be automatically issued to a computer having the associated information.

Returning to the front page 301 of the dealer 30 shown in FIG. 10, the customer can further see another page of the dealer 30. FIG. 11 shows a page 302 appearing when the customer clicks a "energy saving proposal" 301b, and FIG. 12 shows a page 303 appearing when the customer clicks a "super amorphous transformer" picture 302g in FIG. 11. In this way, various types of pages are prepared even in the respective dealers 30 so that the customer can know the summary of a desired transformer. In this conjunction, the pages of FIGS. 3 to 11 are given as ones of the pages of web sites currently already opened and indicate well-known technical contents including the hyperlink structure.

In the present invention, an improvement unique to the present invention is provided from parts shown in bottom parts of the page 303 of FIG. 12. More specifically, for the purpose of widely and quickly spreading transformers having energy saving and environmental effects and for the purpose of easy understanding of the customer who accessed the web site of the sales department (business window or dealer), the sales department is associated with the measurement department in charge of transformer measurement to provide quick response and record thereof to the customer, contents of which will be detailed.

First, in the bottom part of the transformer introduction page 303 shown in FIG. 12, a "renewal" 303a and a "new installation" 303b are provided as menu items for customers. The present invention is designed so that, when a customer desires renewal and issues the order of the "renewal" menu 303a, the system performs quick communications between the customer and sales department and factory. The communications include firstly the communication for determination of the installation date of the measuring circuit to inspect the transformer currently being used by the customer, secondly the communication for setting of the date, place and person associated with the previous inspection for the installation of the measuring circuit, and thirdly the communication for renewal proposal of the transformer based on measured data obtained by the measuring circuit. In accordance with the present invention, these communications can be quickly carried out, the customer can quickly know quantitative data about what degree of economical effect of the transformer of the renewal proposal in energy saving when compared with the existing transformer currently being used and also about what degree of environmental effect of the new transformer in $CO_2$ reduction. Thus on the quantitative data, the customer can quickly decide the renewal for the energy saving and $CO_2$ reduction. In FIG. 12, when the customer desired "new installation", the type of the transformer is nearly uniquely determined by customer's load demand. Explanation will now be made as focused on the "renewal" below.

In FIG. 12, when the customer clicks the "renewal" menu 303a and its click signal is received by the WWW server 31 of the dealer 30, the WWW server 31 registers the address of the customer's user terminal 10 in the customer DB 35, calls a first response message from the mail server 32, and transmits the message to the user terminal 10. The response message has such contents as, e.g., shown in FIG. 13 and previously prepared in the mail server 32 as a formatted document. The response message 304 contains roughly two messages. The first message is a contents introduction message to be serviced by the electric company with respect to the renewal. That is, the message shows a procedure up to the renewal including a first step of installing the measuring circuit to grasp the actual power use condition of the customer, a second step of proposing an optimum renewal proposal after measurement of the customer's actual power use condition for a predetermined period of time, a third step of giving an opportunity for the customer to judge the renewal proposal, and a fourth step of determining the installation date, etc., of the renewal transformer. The second message is an inquiry message for installation of the measuring circuit in the first step. That is, the message contains response columns of "capacity", "phase number", "primary voltage", "secondary voltage", "number of transformers being installed", "manufactured year" and "manufacturer" of the transformer currently being used by the customer, a response column of occurrence or non-occurrence of "power failure", and a response column of a desired date for the installation of the measuring circuit. Further, since the installation of the measuring circuit in the above first step involves the works belonging to a special field of electrical work, it is often beyond dealer's business range. For this reason, the installation of the measuring circuit is often done by engineers of the factory as shown in the message of the first step. Accordingly, when the response message 304 is transmitted from the dealer 30 to the user terminal 10, if the address of the factory 40 is added to the CC field of the mail, then the factory 40 will take part in the communication thereafter. A solid line 38 in FIG. 1 corresponds to this communication line. In this connection, though not shown in FIG. 1, if the address of the business window 20 is added to the CC (carbon copy) field of the response message 304 from the dealer 30, then the CC of the response message 304 can be transmitted also to the business window 20. In the sequence of FIG. 2, parts shown by "CC" indicate broadcast communication.

In the user terminal 10 which received the response message 304, the customer can give a reply to the response message 304. The replay is carried out by the customer who enters predetermined items in the entry columns of the response message 304 and clicks a button "send". Of the reply items; for the "capacity", "phase number", "primary voltage", "secondary voltage", "number of transformers being installed", "manufactured year" and "manufacturer" of the transformer currently being used by the customer; it is convenient to employ known pull-down menus as shown in FIGS. 14A to 14G. For the item of customer's "capacity", he can click corresponding one or ones from a group of listed capacities. Even with respect to the "phase number", "primary voltage", "secondary voltage", "number of transformers being installed", "manufactured year" and "manufacturer", the customer can click corresponding one from a list in each menu. For the reply as to "possible" or "impossible" power failure (though the power failure is necessary from the viewpoint of safety), it is convenient to employ an alternative check box as shown by item ② in FIG. 13. With regard to the desired date of the measuring circuit installation, it is convenient to employ a pull-down menu to select one of listed dates as shown in FIG. 14H.

An example of reply results prepared by the customer in the aforementioned manner is shown in FIG. 15. The example of a reply document 102 indicates that the number of transformers to be renewed is five (two transformers for 50 kVA, two transformers for 500 kVA and one transformer for 1000 kVA), the power failure for the installation and wiring of the measuring circuit is "possible", and the desired date of the installation and wiring of the measuring circuit is Oct. 20, 2001. And when the customer clicks the button "send", this causes the reply document 102 to be transmitted to the factory 40 (and also to the dealer 30 and business window 20 as its CC's).

In the factory 40 when received the reply document 102, the following processings are carried out. First, searching operation is carried out to know whether or not the factory 40 can cope with the date of Oct. 20, 2001 as the installation/wiring date of the measuring circuit desired by the customer. In this connection, when already-set schedules of all in-charge persons are previously stored in in-charge person/schedule areas of various DB's 45, the conclusion of "possible" or "impossible" can be done by performing the searching operation for the data. An example of such schedule data is given in FIG. 24 as a schedule table of in-charge person "Taro . . . ". According to this table, the-schedule is absent on Oct. 20, 2001, the factory 40 can cope with the customer's desired date. Second, a response message to the customer must be prepared. The response message includes roughly three messages. The first message is a confirmation message to the reply document 102 of the customer. The second message is a return message indicating whether or not the measuring circuit can be installed and wired on the customer's desired date. The third message is an inquiry message to inquire the date and place of the installation of the measuring circuit for previous inspection. A result after the above two operations are executed is given in FIG. 16 as a response message 401.

The response message 401 corresponds to an order acceptance table into which the contents of the reply columns in the reply document 102 shown in FIG. 15 are summarized as the aforementioned confirmation message 401b. Next, a response message 401c indicates that, as a result of the above first searching operation, it was determined that the installation and wiring of the measuring circuit can be implemented on Oct. 20, 2001. Further, an inquiry message 401d indicates the date and place associated with the previous inspection for smooth installation of the measuring circuit. In the inquiry message 401d, input columns for first to third wishes or preferences are provided for the "desired date" associated with the previous inspection for installation of the measuring circuit, input columns of "address", "company name", "name of person to be contacted" and "telephone number" are provided for the "place", and reply columns for specification of whether the transformer in use is installed indoors or outdoors and for specification of whether or not the measuring circuit can be connected indoors are provided.

A formatted document for the response message 401 is beforehand prepared in the mail server 42, and the response message 401 can be prepared by automatically or manually inputting the confirmation message 401b and response message 401c in the formatted document. In this connection, one line of sentence 401a relating to "a continued patronage for the transformers manufactured by our company" can be automatically added through searching operation for the manufacturing company name in the customer's reply document 102.

The customer, when receiving the response message 401, he now starts replying works. With respect to the "desired date" (item ①) associated with the previous inspection, three preference dates are input with use of pull-down menus as shown in FIGS. 17A and 17B. The "address", "company name", "name of person to be contacted" and "telephone name" in item ② are input by the customer. With regard to the installation place of the transformer (item ③), "indoors" is selected with use of a check box menu. Lastly, the indoors installation (item ④), "possible" is selected. A reply document 103 after the above customer's entries is shown in FIG. 18. The customer is only required to transmit the prepared reply document 103.

The factory 40 after receiving the reply document 103 performs operations which follow. First, the searching operation is executed for the previous inspection date desired by the customer and the schedule of the factory in-charge person. With regard to this, as already explained in FIG. 24, a conclusion that when and who can cope with it can be obtained by previously storing set schedule data for all the in-charge person in the in-charge person/schedule areas of various DB's 45 and searching the DB's for the data. In this case, the searching operation is carried out preferentially from customer's first preference, as a matter of course. Second a response message to the transformer is prepared. A result after these two searching and message-preparing operations were executed is shown by a response message 402 in FIG. 19. The response message contains roughly-four messages. That is, the first message is a copy message 402a of the confirmation message 401b shown in FIG. 16, the second message is a confirmation message 402b for the previous inspection date and place last determined, the third message is a response message indicative of the last-determined previous inspection date and visitor, and the fourth message is a reference message 402d directed to our company. A formatted document for the response message 402 is prepared in the mail server 42 as in the above case, the response message 402 is completed by automatically (or manually) inputting necessary information in the formatted document. When the response message 402 is transmitted, this means that the preparation of the previous inspection has been completed.

FIG. 20 shows an example of a measuring circuit connected to the network configuration of FIG. 1, after the previous inspection of the customer's transformer is completed and the installation of the measuring circuit is completed. The measuring circuit shown in the upper part of FIG. 20 is a circuit when the supplied transformer is of a three phase type, for which reason, input-side voltage and current can be measured two VT(voltage transformer)'s and two CT(current transformer)'s. An output-side voltage can be measured by a power high tester and an output-side current can be measured by two CT's. Measured data from the installed measuring circuit of the customer transformer in its actually operated state can be sent in various manners to the factory 40. In the example of FIG. 20, the output of the measuring circuit is sent as electronic data into measured-data areas of the various DB's 45 in the factory from the customer or user terminal 10 via the Internet 1. FIG. 21 shows an example of measured results of a certain transformer for nine days, and FIG. 22 shows a day load curves of another transformer for four days. By precisely inspecting the actual power use condition of each customer transformer in its actual operation, an optimum renewal proposal can be proposed.

FIG. 23 shows an example of a response message 403 containing a renewal proposal. More specifically, FIG. 23 is a proposal example of three renewal features and detailed renewal contents of each transformer, based on a result of the grasped power use condition of five transformers. For example, with respect to two Nos. 1 and 4 transformers of 50 kVA, since the both have small general power and receptacle load, the both can be combined into a single 75 kVA transformer. Even with respect to two Nos. 2 and 3 transformers of 500 kVA, since the both have small loads less influenced by noise and voltage variations, the both can be combined into a single transformer of 500 kVA. With respect to No. 5 transformer of 1000 kVA, further, it has a capacity sufficient for a press ON/OFF load and, even when the capacity is reduced, it exercises a less effect on its workability. Thus the transformer can be replaced by a 750 kVA transformer. As a result of such combinations of these transformers and renewal to energy saving transformers, the aforementioned load loss and no-load loss can be reduced, whereby reduction data in the power amount and fee can be quantitatively presented. Further, the reduction of the power amount enables quantitative presentation of even $CO_2$ quantity. Since such a response message 403 is proposed to the customer, the customer can concretely judge the renewal or non-renewal.

In this way, in accordance with the present invention, close cooperative communication can be achieved between the sales department and the measurement department in charge of the transformer measurement, and the system can cope with the customer who accessed the web site of the sales department to provide quick response and record thereof. With respect to the record, mutual communication contents is left as electronic data and valid for promotion of smooth business data processing procedure.

In this connection, as shown in FIG. 5, "annual loss power amount fee (thousand yen/year)" can be calculated according to an equation of $\{[\text{no-load loss (W)}+\text{load loss (W)} \times (\text{load factor})^2]/1{,}000 \times 365 \text{ (days)} \times 24 \text{ (h)} \times \text{unit electricity charge (11 yen/kWh)}/1{,}000\}$. From the calculated annual loss power amount fee and the no-load loss (W) and load loss (W) of the proposed renewal transformer and the above load factor, reduced power amount and reduced power fee can be estimated. Even a $CO_2$ reduction (t/year), as shown in FIG. 5, can be calculated from, e.g., a $CO_2$ emission coefficient of 0.423 (kg·$CO_2$/kWh) at a power receiving end in 1990.

With respect to the installation date setting of the renewal transformer in the step 4 shown in FIG. 15, the system can quickly cope with it on the basis of a customer's reply document 104 (FIG. 2) to the response message 403 shown in FIG. 23 and of a dealer's response 305 (FIG. 2), and even the $CO_2$ reduction can be easily achieved by a technique shift 404 (FIG. 2) of the data calculation method from the measuring circuit.

Although the above explanation has been made in connection with the example where the response message (renewal proposal) 403 is transmitted from the factory 40 in the foregoing embodiment, the message transmission is not limited to the factory 40 but may be carried out from the business window 20 or from the dealer 30. In this case, in order to cope with it, it is only required that the business window 20 or dealer 30 be equipped with various DB's.

As has been explained in detail in the foregoing, in accordance with the present invention, the sales department issues the first response including customer's desired inquiry about the installation date of the measuring circuit to the customer who accessed the web site of the sales department; the measurement department in charge of the measurement of the transformer issues the second response including the installation date of the measuring circuit to the customer's reply to the first response, to thereby cooperative communication between the sales department and the measurement department in charge of the transformer measurement and to quickly cope with the customer who accessed the web site of the sales department to provide quick response and record thereof. Accordingly, the social demand of early realization of energy saving and $CO_2$ reduction can be realized with highly excellent effects.

What is claimed is:

1. A method for supporting orders for a transformer received via a web site of a sales department, the sales department is associated with a measurement department in charge of transformer measurement, the method comprising steps of:

provimg a renewal item as a menu item in a transformer introduction page of the web site;

when the renewal item is selected by a customer, displaying at the customer's terminal an order of the renewal menu including:

an installation date of a measuring circuit to inspect loss of the transformer currently being used by the customer; and at least one of a date, a place, or a person associated with a previous inspection, for the purpose of installing the measuring circuit;

in the sales department, when an indication of selection of the renewal item is received, then: registering an address of the customer's terminal in a customer database; obtaining a response message from a mail server; and transmitting the response message to the customer's terminal, the response message including a contents introduction message to be serviced by an electric company with respect to the renewal and an inquiry message for installation of the measuring circuit in a first step, the contents introduction message including:

a description of a first step of installing the measuring circuit to obtain actual power use condition of the customer;

a description of a second step of proposing an optimum renewal proposal after measurement of the customer's actual power use condition for a predetermined period of time;

a description of a third step of giving an opportunity for the customer to judge the renewal proposal; and when the renewal item is selected by a customer, displaying at a customer's renewal transformer, the inquiry message including:

response columns of at least one of "capacity", "phase number", "primary voltage", "secondary voltage", "number of transformers being installed", "manufactured year" and "manufacturer" of the transformer currently being used by the customer;

a response column of occurrence or non-occurrence of "power failure"; and a response column of a desired date for the installation of the measuring circuit; and in the customer's terminal, when receiving the response message, then receiving information from the customer for a reply to the response message and sending the reply to a factory, the reply containing at least one of "capacity", "phase number", "primary voltage", "secondary voltage", "number of transformers being installed", "manufactured year" and "manufacturer" of the transformer currently being used by the customer.

* * * * *